United States Patent [19]

Olsen et al.

[11] 4,076,965

[45] Feb. 28, 1978

[54] UNIVERSAL RECEIVER/SENDER

[75] Inventors: Rolf Einar Olsen; Ernst August Munter, both of Ottawa, Canada

[73] Assignee: Northern Telecom Limited, Montreal, Canada

[21] Appl. No.: 717,618

[22] Filed: Aug. 25, 1976

[51] Int. Cl.² .............................................. H04Q 1/50
[52] U.S. Cl. .......................... 179/16 EC; 179/84 VF
[58] Field of Search ........ 179/16 EC, 84 VF, 15 BY, 179/18 EB, 18 ET

[56] References Cited

U.S. PATENT DOCUMENTS 3,821,484   6/1974   Sternung ......................... 179/84 VF Primary Examiner—Kathleen H. Claffy
Assistant Examiner—Joseph A. Popek
Attorney, Agent, or Firm—Frank Turpin

[57] ABSTRACT

A universal receiver/sender is achieved by providing circuitry having parameters setable by binary data words from the data processing unit of a switching facility. A clock signal generator provides output signals corresponding to respective binary instruction words whereas the parameters of an analogue signals receiving circuit are controlled by binary control words. A plurality of commutating filter circuits receive pass band limited analogue signals from the receiving circuit and under control of signals from the clock generator provide binary output signals indicative that a signal within a predetermined pass band has been received. Also provided is a data store for storing the required instruction and control words as well as the output signals from the filter circuits. In addition, a signal generating circuit is responsive to predetermined clock signals to generate substantially sinusoidal signals each having a frequency directly proportional to the pulse repetition frequency of the respective clock signal.

4 Claims, 7 Drawing Figures

UNIVERSAL RECEIVER/SENDER

The present invention relates to signalling apparatus for receiving and sending signalling between switching facilities in a telephone network and more particularly to a receiver/sender apparatus which is adaptable by word instructions to perform the required receiving and sending function throughout a wide range of signalling formats.

The economical manufacture of telephone switching equipment is often decided by the extent of the world market place in which the manufacturer can sell the equipment. The future development of new and potentially better telephone switching facilities is seriously considered in the light of the available market potential. One of the major factors in determining the extent, and hence the potential of the market is the compatibility of the manufacturer's switching equipment as it relates to the telephone network standards in various countries. Clearly, before the switching equipment can even be considered by a potential customer, it must be compatible with the customer's present telephone network.

One of the requirements of the typical telephone switching facility is that it be able to receive supervisory information from other switching facilities and also send supervisory information to other switching facilities. This is typically accomplished by means of dial pulse signalling and/or tone signalling. Different telephone systems have different standards as to the rate and mark/space ratio of dial pulses. Also there are various tone signalling standards as to the frequency, amplitude, duration and combination of tone signals and in certain circumstances as to whether or not signalling is required. For example in North America multiple frequency (MF) signalling system is used almost universally. In the MF signalling system a destination or intermediate office sends a "proceed to send signal" to the originating office which in turn sends all the supervisory information via tone signals. In Europe, compelled multiple frequency (CMF) signalling system is used. An originating office in this system sends one digit of supervisory information, until the terminating office indicates via another tone signal that the required supervisory digit has been received and so on for each digit until all the required supervisory information has been transmitted and received.

Equipment in the particular telephone system must be compatible with the signalling system or systems in order to receive and send signalling. Without exception, the major compatibility problem exists in trying to adapt switching equipment of one design to telephone networks having different signalling schemes or formats.

Typically, a new receiver sender, compatible with the switching facility and compatible with the customer's telephone network signalling scheme must be designed and developed each time a manufacturer is to enter a market place having a different signalling system. This carries two basic disadvantages; one being that the manufacturer must absorb the cost of the new design and development which places him at an economic disadvantage particularly in relation to a domestic manufacturer; and the second being that the manufacturer consequently may not be able to deliver as promptly as would the domestic manufacturer.

The present invention is a receiver/sender apparatus which is programmable for use in many of the well known automatic telephone network signalling systems. The receiver/sender apparatus is responsive to word instructions for its operation. The word instructions may be derived in a suitably programmed processor associated with one or more receiver/sender units or in one or more central processing units in the switching facility. An input/output circuit interfaces between each receiver/sender apparatus and the associated processor. The receiver/sender apparatus both detects and transmits tone signalling and transmits dial pulsing, the parameters of which are defined by instruction word sets unique to the system or systems in which the receiver sender must operate.

The receiver sender apparatus in combination with a switching facility includes a clock for generating clock signals and a word store. Each clock signal has a pulse repetition frequency defined by an associated word obtained from a predetermined location in the word store. A receiver for receiving signals from the telephone network is connected to the clock. The center frequency of the passband of the receiver is determined by the repetition frequency of one of the clock signals from the clock. A signal generating means is also connected to the clock and transmits a tone signal having a frequency as determined by the repetition frequency of another of the clock signals. As the frequency of different clock signals from the clock determine the operating frequencies of the receiver and of the signal generating means, and as the frequencies of the clock signals are determined by associated word instructions from the word store, the receiver sender apparatus is adaptable to interface supervisory signalling signals, in different signalling formats, between telephone networks.

One of the primary contributing elements to this adaptability of the receiver sender apparatus is the clock circuit used to generate the clock signals. The clock circuit is responsive to a master clock signal having a predetermined repetition frequency and instruction words, each of the instruction words defining in combination with the master clock frequency, one of the plurality of clock signals. The clock circuit includes a bit circulator having most significant and least significant bit registers. Each bit register has a plurality of stages corresponding in number to the plurality of generated clock signals and each bit register is responsive to the master clock signal to shift bits therethrough. An adder includes inputs and outputs connected to the first and last stages of each of the bit registers respectively. The adder also includes inputs for receiving the bits of the instruction words. The bits from the instruction word are added in the adder to the bits from the last stage of each bit register and the sum is applied to the first stage of the bit registers. A sampling and storing means stores the bit in each stage of the most significant bit register at a time defined by the master clock signal frequency divided by the number of clock signals, whereby the pulse repetition frequency at each output of the sampling and storing means is defined by the master clock signal and the associated instruction word.

In a simple form the clock circuit generates one frequency which corresponds to the master clock frequency times the value of an instruction word divided by a number $n$. The clock includes an adder having $n$ first inputs for receiving the instruction word, $n$ second inputs and $n$ outputs. A bit circulator including $n$ portions is connected between the $n$ second inputs and the $n$ outputs and is responsive to the master clock signal to circulate bits from the $n$ outputs to the respective $n$ inputs with a delay of the period of the pulse repetition frequency of the master clock signal. The output signal of the most significant of the n portions of the bit circulator is the generated clock signal.

An example embodiment of the invention will now be described with reference to the accompanying drawings in which.

Figure 1:
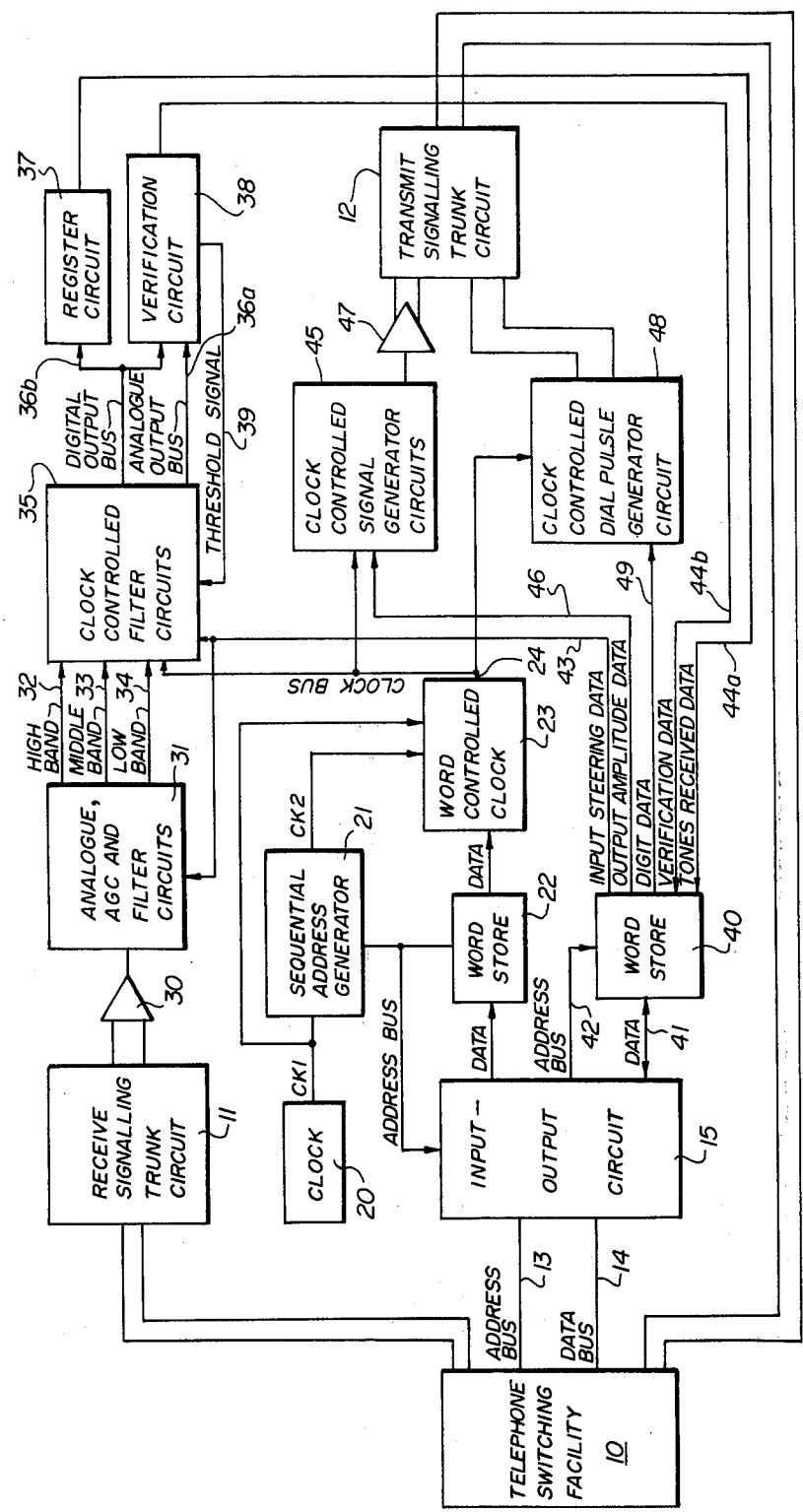
FIG. 1 is a block schematic diagram of a receiver sender apparatus connected with a telephone switching facility.

Referring to FIG. 1, the receiver sender apparatus is connected to a telephone switching facility 10 via receive and transmit signalling trunk circuits 11 and 12, and by address and data buses 13 and 14. A clock circuit 20 supplies clock pulses CK1 to a sequential address generator 21 which generates repetitive sequences of 12 address words. The address words are supplied to a word store 22 and to an input output circuit 15. Data from the data bus 14 is written into the word store 22 by the input output circuit when the address on the address bus 13 coincides with the address from the sequential address generator 21. The sequential address generator 21 also generates a clock pulse CK2 with each completion of a 12 word sequence of addresses. The clock pulse CK2 thus occurs at one twelfth the rate of the clock pulses CK1. These clock pulses are fed to a word controlled clock 23 along with 12 data words per clock pulse from the word store 22. The word controlled clock 23 outputs 12 clock signals onto the leads in a clock signal bus 24. The frequency of each of the clock signals is determined by the frequency of the clock pulses CK1 and by the value of its corresponding data word from the word store 22. The frequency of the generated clock signal is defined by the frequency of CK1 multiplied by the corresponding data word and divided by a fixed factor.

The telephone switching facility 10 determines connections beween the telephone network and the signalling trunk circuits 11 and 12. Signals from the receive signalling trunk circuit 11 are received in balanced configuration by an amplifier 30 and transmitted therefrom in unbalanced configuration to an analogue AGC amplifier and associated filter circuits 31. The circuits 31 are connected to clock controlled filter circuits 35 via a high band lead 32, a middle band lead 33 and a low band lead 34. The analogue AGC amplifier operates on signals having a wide range of amplitudes to bring these amplitudes into a narrow range. The filter circuits are switch controlled to select one or more frequency pass bands for transmission of signals from the AGC amplifier to the filter circuit 35. The filter circuits 35 include a plurality of pass band circuits each of which is adjustable as to its center frequency by a clock signal on the clock bus 24.

A word store 40 is connected to the input-output circuit 15 via a 2-way data bus 41 and an address bus 42. Receive signal input steering data is transferred from the word store 40, via leads 43, to the analogue AGC amplifier and filter circuits 31 and to the clock controlled filter circuits 35 to define bands passed by the filter circuits 31 and the input configuration of the controlled filter circuits 35. Each of the filter circuits 35 compares the amplitude of a signal in its pass band with a threshold level to provide a binary output on a digital output bus 36b. The digital output bus is connected to a register circuit 37 and to a verification circuit 38. An analogue output lead 36a and a threshold signal lead 39 are connected between the filter circuits 35 and the verification circuit 38. The verification circuit 38 checks to determine if sufficient signal is passed by any of the filters in the controlled filter circuits 35 and to determine if signals on the digital output bus 36b persist for required periods of time and in proper combination to represent valid signalling. This circuit also generates the threshold signal on the lead 39 for use by the filter circuit 35. The outputs of the register circuit 37 and of the verification circuit 38 are carried to the word store 40 via a tone received data bus 44a and a verification data bus 44b respectively. The information on these buses is held in the word store 40 for access by the telephone switching facility 10 via the input output circuit 15. Hence signalling received by the receive signalling trunk circuit 11 is registered digitally in the register 37 and the word store 40, with an indication as to the validity of the received signalling also being registered in the word store 40.

Signalling transmitted by the receiver sender is also controlled by word instruction via the word controlled clock 23. Clock controlled signal generator circuits 45 are each connected to an individual lead in the clock bus 24, and each are also connected to a word location in the word store 40 via leads in an output amplitude data bus 46. Each of the clock controlled signal generator circuits 45 generates a sine wave function having a frequency related to the clock pulse repetition frequency of the clock signals on the associated lead in the clock bus 24, and having an amplitude substantially as defined by an amplitude word in the word store 40 conveyed by the bus 46. Output signals, i.e. the sine wave functions, are added together and applied to the input of an amplifier 47 which amplifies the output signals and applies these signals, in balanced configuration, to the transmit signalling trunk circuit 12.

Outpulsing is likewise controlled by the clock pulse repetition frequency on one of the leads in the clock bus 24, which is connected to a clock controlled dial pulse (DP) generator circuit 48. This provides for dial pulse sending rates which are adjustable and very accurate. The digit for transmission is stored at a word location in the word store 40 which is connected to the DP generator circuit 48 via a digit data bus 49. The mark space ratio of dial pulses can be fixed internally in the DP generator or can be defined by an additional word from the word store 40. Various digital circuit designs are available which can be utilized to provide the dial pulse generator 48. One example is described in the Canadian Pat. No. 926,049 entitled "Dial Pulse and Multiple Frequency Signalling Receiver Apparatus" issued to A. E. Dodson on May 8, 1973. Since that time, various large scale integrated circuits have become commercially available which are economically attractive and which are ideally suited to the implementation of this function however yet based on the principles of dial pulse generation substantially as taught by A. E. Dodson. The output of the clock controlled DP generator circuit 48 is connected to the transmit signalling trunk circuit 12.

Figure 2:
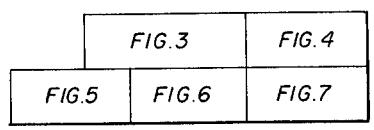
FIG. 2 is a diagram showing the relationship between the remainder of the drawings.

The example embodiment thus far described in reference to FIG. 1 has illustrated one form of system architecture and operation for meeting the requirements of a receiver sender apparatus adaptable, through the use of word instruction, to a plurality of signalling systems. A more detailed discussion of parts of the example embodiment follows, with reference to FIGS. 3 – 7 which are interrelated as shown in FIG. 2.

Figure 3:
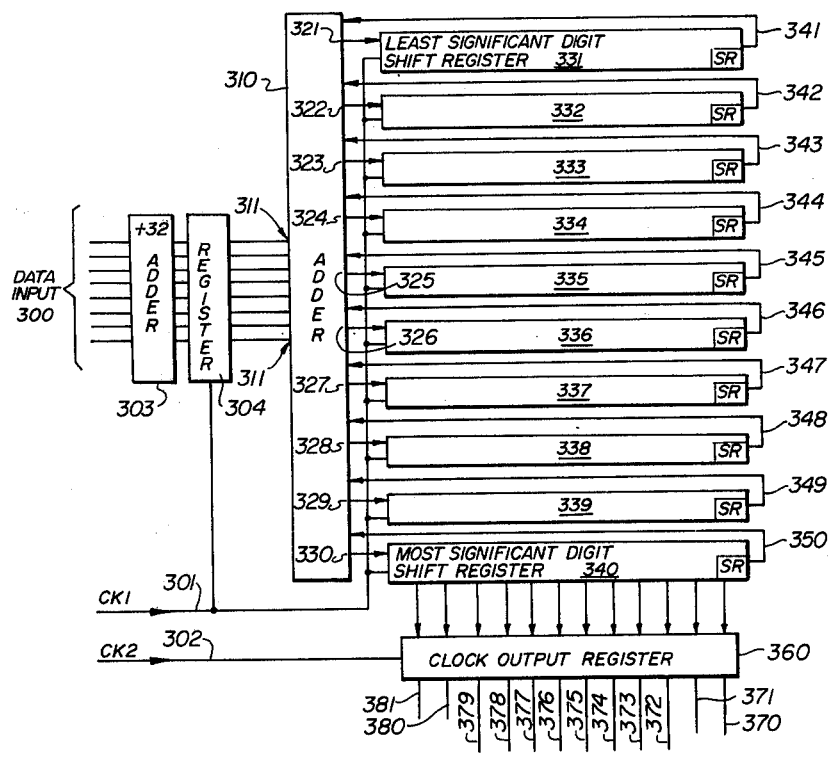
FIG. 3 is a schematic block diagram of a word controlled clock used in FIG. 1.

Referring to FIG. 3, a word controlled clock is shown having a data input 300 for receiving eight bit words, a clock input lead 301 for receiving clock signals (CK1) and a clock input lead 302 for receiving clock signals (CK2) at a fraction of the rate of the clock signals (CK1). In this embodiment, the rate of clock signals (CK2) is one twelfth the rate of clock signals (CK1). The clock signals (CK1) and the clock signals (CK2) are received from the clock 20 in FIG. 1 and from the sequential address generator 21 in FIG. 1. The eight bit words are received from the output of word store 22, with a new word being received at the data input 300 in synchronism with each clock signal (CK1). The data input 300 is connected to the input of an adder 303. A nine bit output of the adder 303 is connected to the data input of a register 304 which also has an input connected to the clock input lead 301. The output of the register 304 is connected to an adder 310 via a data input 311 of the adder 310. Ten data output leads 321 – 330 are connected between 10 outputs of the adder 310 and the inputs of 10 shift registers 331 – 340 respectively, and each 12 stages in length. The shift register 331 is labelled as the least significant digit shift register, and the shift register 340 is labelled as the most significant digit shift register. Each shift register 331 – 340 includes a shift input connected to the clock input lead 301. The output of the last stage of each of the shift registers 331 – 340 is connected to one of 10 more inputs of the adder 310 via leads 341 – 350. A clock output register 360 includes 12 inputs connected to outputs of the 12 stages of the most significant digit shift register 340. The clock output register 360 also includes an input for receiving clock signals (CK2) and is connected to the clock input lead 302.

In operation the lowest frequency clock signal which can be generated is determined by the adder 303 which always adds a constant ($+32$) to each instruction word the register 304 loads the instruction word $+32$ with each occurrence of a clock pulse on the lead 301. The shift register 331 – 340 are caused to shift by the clock signal on the lead 301 and so are synchronized with the loading of the register 304. The output of the last stage of each of the shift registers 331 – 340 is conducted via leads 341 – 350 respectively to the adder 310. The output of the register 304 and the bits on the leads 341 – 350 are added together with the sum word being presented to the first stages of the shift register 331 – 340 via the adder outputs 321 – 330 respectively. The most significant bit of each sum word is loaded into the clock output register with each occurrence of a clock pulse (CK2) on the lead 302. Each sum word increases in value toward a maximum beyond which it returns toward zero and increases again. Each sum word is monitored by the clock output register 360 at the instant in which each sum word is at a consistent predetermined location in the shift register 331 – 340. This has the effect of producing a 50% duty cycle clock signal at each of the twelve outputs of the clock output register. These output clock signals appear on leads 370 – 381 respectively and are henceforth referred to as clocks 0 – 11 respectively. These clocks 0 – 11 each have a repetition frequency which is proportional to the value of the instruction words from corresponding word locations in the word store 22 in FIG. 1.

DETAILED CLOCK OPERATION

A more detailed explanation of the operating theory of the word controlled clock in FIG. 3 follows, however understanding of the detailed theory of operation is not necessary for the construction of the example embodiment. A detailed understanding of the operation of the word controlled clock is helpful if one wishes to derive the particular word instructions required to operate the receiver sender in any given signalling format. The detailed explanation is simplified by considering the operation of only one clock and does not take into account the time shared aspect of the hardware of FIG. 3 as it is utilized to generate multiple clocks. Hence the length of each shift register 331 – 340 is only one stage instead of 12 stages and the pulse repetition frequency of CK1 is equal to that of CK2.

The shift registers 331 – 340 at any time store the numerical value $Q_x$. The registers are continuously clocked by the clock signal with the frequency $fm$, and the contents of the registers change with every clock pulse so that $$Q_{(x+1)} = (Q_x + P + K)_{modulo\ 2^N} \qquad (1)$$

(in this embodiment $N = 10$)
where $P$ is a programmable value and $K$ is a fixed value, and where $$P + K < 2^{N-1} \qquad (2)$$

Combining (1) and (2), the value of Q follows $$Q_{x+1} = Q_x + P + K \text{ if } (Q_x + P + K) < 2^N \qquad (3a)$$

$$Q_{x+1} = Q_x + P + K - 2^N \text{ if } (Q_x + P + K) \geq 2^N \qquad (3b)$$

The most significant bit of Q is defined "high" for $Q \geq 2^{N-1}$ and "low" for $Q < 2^{N-1}$. Because of (2), it takes at least two and at most $2^N/(P+K)$ clockpulses for Q to transverse its range, corresponding to a "low" – "high" cycle of the most significant bit (MSB) of Q. The "high" – "low" transition of the MSB is characterized by (3b). After $n$ clockpulses $$Q_{x+n} = [Q_x + (P+K) * n] \text{ modulo } 2^N \qquad (4)$$

or $$Q_{x+n} = Q_x + n * (P+K) - m * 2^N \qquad (4b)$$

where $m = \text{integer}\left[\dfrac{Q_x + n * (p+K)}{2^N}\right]$

For $n = 2^N$ this becomes $$m = \text{integer}\left[\dfrac{Q_x}{2^N} + P + K\right] = P + K$$

-continued because $\frac{Q_x}{2^N} < 1$ by definition;

Thus $$Q_{x+2^N} = Q_x$$

This means that the cycle repeats exactly after every $2^N$ clockpulses, and during each cycle the number of "high" - "low" transitions of the MSB is equal to P+K. The programmed frequency is thus $$fp = fm * (P+K/2^N) \qquad (6)$$

The number ($t$) of clockpulses between any two "high" - "low" transitions of the MSB is derived below:
Any $Q_x$ is chosen so that $$Q_x + P + K \leq 2^N \qquad (6b)$$

Then $Q_{x+1} = Q_x + P + K - 2^N$ from this follows that $$O \leq Q_{x+1} < P+K \qquad (7)$$

After $t$ clockpulses and A "high" - "low" transitions:

$$Q_{x+1+t} = Q_{x+1} + t(P+K) - 2^N \cdot A \qquad (8)$$

where $$O \leq Q_{x+1+t} < P+K \qquad (9)$$

from (7,8,9):

$$t = A * \frac{2^N}{P+K} + \frac{Q_{x+t+1} - Q_{x+1}}{P+K}$$

$$= A * \frac{2^N}{P+K} \pm E \qquad (10)$$

where $E < 1$

The component $(2^N/P+K) = (fm/fp)$ is the average period of the programmed frequency output $fp$ expressed as a fractional number of clockpulses CK1; E is the rounding error to make $t$ an integer number. The time period between any two (not only between consecutive) transitions deviates from the average by less than one clock period of the clock CK1. This has the effect that even after further simple division of $fp$ by R to obtain $fx$, the phase jitter of $fx$ is less than one clock period of $fm$.

Figure 4:
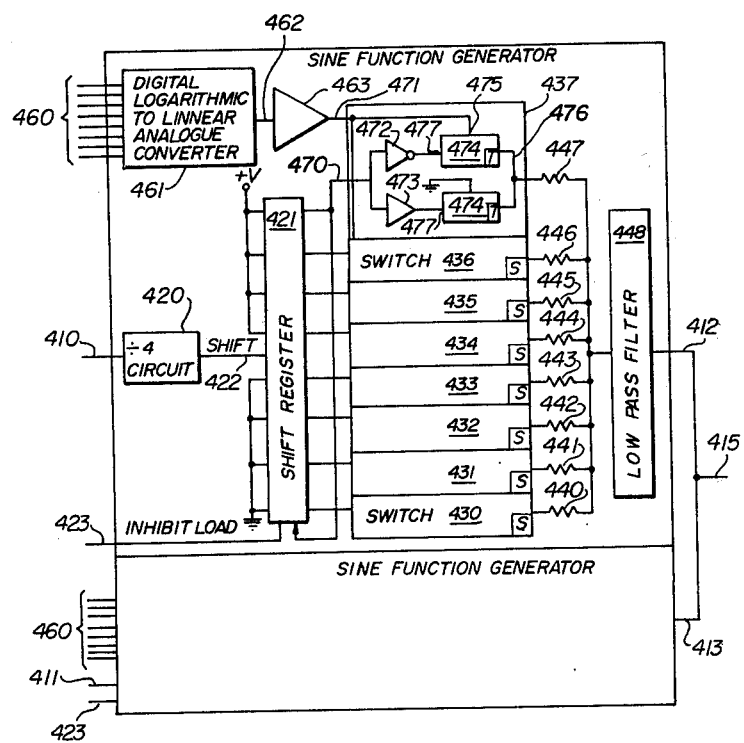
FIG. 4 is a schematic block diagram of a multiple frequency clock controlled signal generator used in FIG. 1.

Referring to FIG. 4, two sine function generators generate the in-band AC signalling required for operation of the switching facility. Each sine function generator is controlled in operation by a clock. The first sine function generator has a clock input 410 connected to the lead 370 from FIG. 3, and likewise a clock input 411 of the second sine function generator is connected to the lead 371. Data input leads 460 carry output amplitude data from the bus 46, in FIG. 1, to each of the sine function generators.

Regarding FIG. 4, only one of the sine function generators will be described in the following, as the other generator is identical in structure and operation.

The sine function generator includes a divide by 4 circuit 420 connected between the clock input 410 and a shift input 422 of a shift register 421. The shift register includes eight stages, with the output of the last stage connected to the input of the first stage. The first four stages have load inputs connected to ground, i.e. binary one, and the last four stages have load inputs connected to a positive voltage, i.e. binary zero. Each of the stages is also connected to an inhibit and load input lead 423. The data input leads 460 are connected to the input of a digital logarithmic to linear analogue converter circuit 461 which has an analogue output 462 connected to the input of a buffer amplifier 463. Eight transmission switches 430 - 437 are each connected to the output of the buffer amplifier 463. Each of the transmission switches 430 - 437 is connected to the output of a corresponding stage of the shift register 421. The output of each of the transmission switches 430 - 437 is connected, via an associated resistor 440 - 447, to the input of a lowpass filter 448. Suitable ratio values of the resistances for the function of sine wave generation are listed in the following table.

| Resistor Number | Resistor Value |
|---|---|
| 440 and 447 | 505 R |
| 441 and 446 | 177 R |
| 442 and 445 | 118 R |
| 443 and 444 | 100 R |

The output of the lowpass filter 448 is connected to an output terminal 412. In the case of second sine function generator the output terminal is labelled 413. Referring to FIG. 1, the lead of 415 in FIG. 4 corresponds to the lead connecting the clock controlled signal generator circuit 45 to the input of the amplifier 47.

As the transmission switches 430 - 437 are identical only one switch 437 is shown in detail. The transmission switch includes a switch control input 470 and an amplitude control input 471. The input 470 is connected to the inputs of an inverting buffer 472 and to the input of a noninverting buffer 473. A pair of transmission gates 474 each include an input port 475, an output port 476 and a control port 477. One of the transmission gates 474 is connected to the output of the buffer 472 via its control port 477, and its input port is connected to the amplitude control input 471. The other of the transmission gates 474 is connected to the output of the buffer 473 via its control port 477, and its input port is connected to ground. The output ports 476 are connected together and constitute the output of the transmission switch, which in this case is connected to the resistor 447.

In operation, assertion of a signal on the inhibit and load lead 423 is controlled directly by the switching facility or indirectly via a bit in the word store 40. Signal assertion causes the shift register 421 to be loaded, the first four stages being low and the last four stages being high. When the signal on lead 423 is unasserted, clock signals from the lead 370 are divided by the divide by 4 circuit 420 and the resulting signal at the input 422 causes the shift register 421 to shift. As the output of the last stage is connected with the input of the first stage, the effective result is that of a circulating square wave, half the stages of the shift register 421 always being high and half of the stages always being low.

This circulating square wave drives the control inputs of the transmission switches 430 - 437 to connect the resistors 440 - 447 alternately to ground and to the amplitude control input 471 via the transmission gate 474. Data appearing on the leads 460 is a logarithmic representation of the desired amplitude of the signal, in decibels. This data is converted to an equivalent analogue voltage and after being amplified with unity voltage gain by the buffer amplifier 463 is applied to the input 471. Hence the voltage at the input 471 directly determines the amplitude of the AC signal passing through the low pass filter 448. The AC signal from the filter 448 is added to the signal from the low pass filter in the other sine function generator. This is assuming of course that the leads 423 from the two generators are connected in common. If however the generators are controlled independently, assertion of a signal on the lead 423 of one generator halts its operation and the receiver sender would then also generate single frequency signalling as required by the switching facility.

Figure 5:
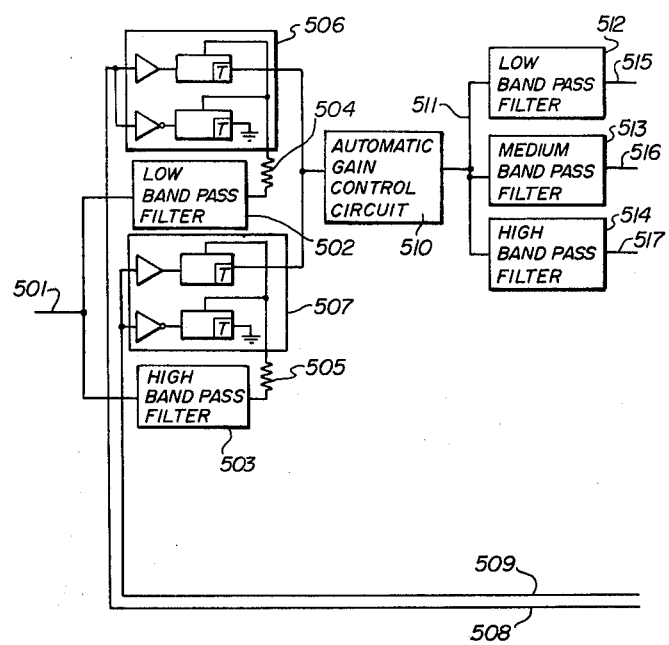
FIG. 5 is a schematic block diagram of a filter and automatic gain control circuit used in FIG. 1.

Referring to FIG. 5, analogue AC signals are received on a lead 501. In FIG. 1 the lead 501 is equivalent to the connection between the amplifier 30 and the circuits 31. A low band pass filter 502 and a high band pass filter 503 are each connected in series between the lead 501 and resistors 504 and 505 respectively. Transmission switches 506 and 507, similar to the transmission switches 430 – 437 in FIG. 4, are connected between the resistors 504 and 505 respectively and the input of an automatic gain control (AGC) circuit 510. Switch control leads 508 and 509 are connected to control inputs of the transmission gates 506 and 507 respectively. The AGC circuit 510 has an output terminal 511 which is connected to inputs of a low passband filter 512, a medium band pass filter 513 and a high band pass filter 514. These filters are each connected to output leads 515, 516 and 517 respectively.

In operation, the circuit in FIG. 5 determines the basic receive band of the receiver sender apparatus. AC signals on the lead 501, having a frequency within the pass bands of the low or high pass band filters 502 and 503, are accordingly passed on to the transmission switches 506 or 507. Depending upon the state (low or high) of the leads 508 and 509 the outputs of the filters 502 and 503 are effectively connected to the AGC circuit 510 or to ground. Thus the receive band is determined as being high, low or both high and low bands. The AGC circuit 510 amplifies signals received at its input and having an amplitude within about a 33 db range, so that these signals have an amplitude varying by no more than 1 to 2 db at the output of the AGC circuit 510. These signals are separated according to the frequency on the three leads 515 – 517 by the filters 512 – 514.

Figure 6:
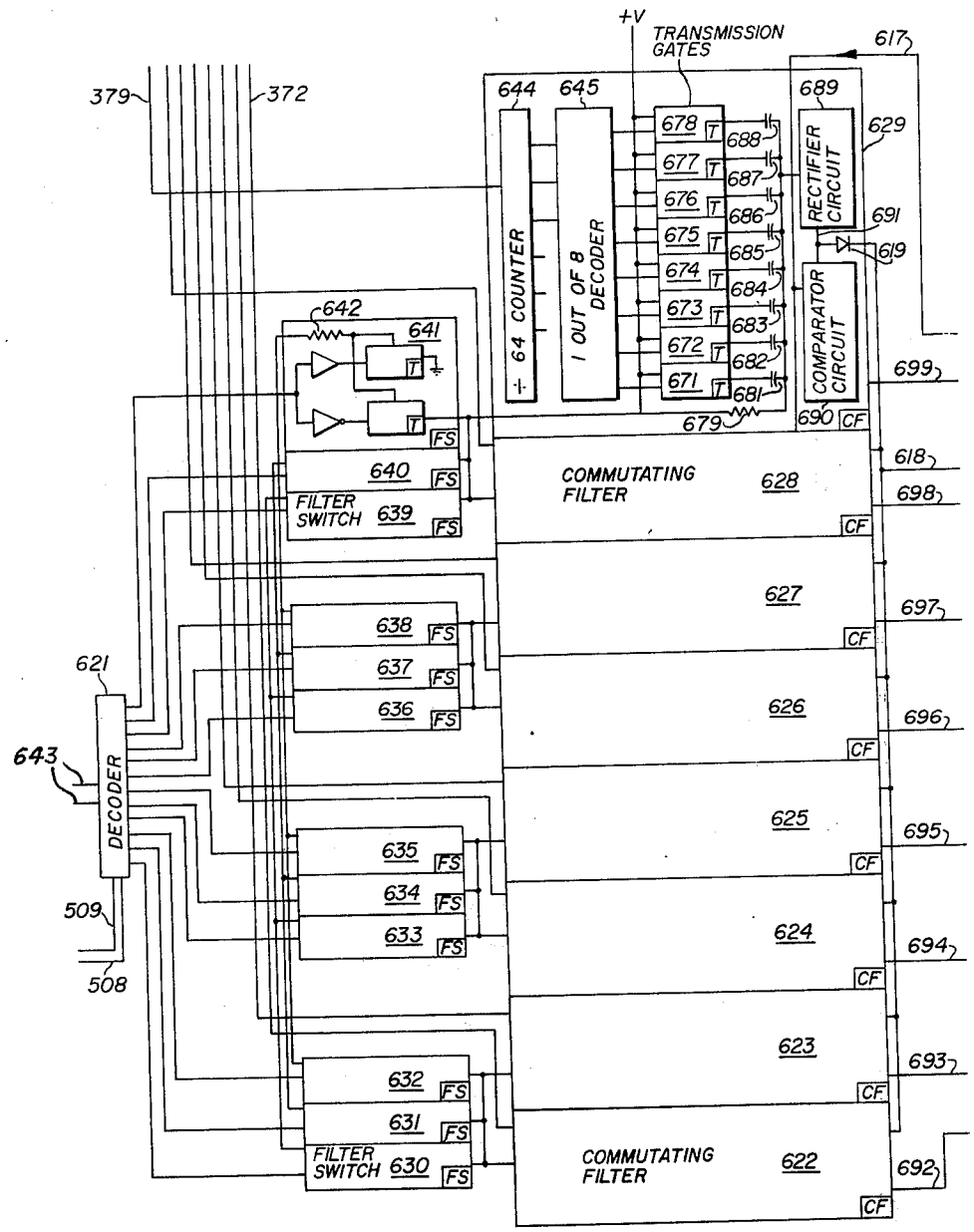
FIG. 6 is a block schematic diagram of clock controlled filter circuits used in FIG. 1.

The circuit in FIG. 6 in combination with the circuit in FIG. 3 provides the wide range of flexibility available in the receive portion of the receiver sender apparatus. The circuit in FIG. 6 includes eight commutating filter circuits 622 – 629 preceded by 12 filter transmission switches 630 – 641. The filter transmission switches 630, 633, 636 and 639 each have an input connected with the high band pass filter 514 via lead 517 in FIG. 5. In like manner the switches 631, 634, 637 and 640 are connected to the medium bandpass filter 513 via the lead 516, and the switches 632, 635, 639 and 641 are connected to the low band from filter 512 via the lead 515. Each of the filter transmission switches 630 – 641 is similar to the transmission gates 430 – 437 in FIG. 4 and the transmission switches 506 and 507 in FIG. 5 except for the addition of a resistor 642 in series with the input port of the transmission gates. Each of the filter transmission switches also includes a control input separately connected to a decoder circuit 621. The decoder circuit 621 also includes two outputs connected to the inputs of the transmission switches 506 and 507 via the leads 508 and 509 in FIG. 5. The decoder circuit 621 also includes inputs connected with bus leads 643 over which instruction words are received. This contrasts with an alternate arrangement in FIG. 1 in which the analogue AGC amplifier and filter circuit 31 and the clock controlled filter circuit 35 are shown to be controlled directly by instruction words from the word store 40 via the receive signal steering data bus 43. The commutating filter circuits, as exemplified by the filter circuit 629, each include a divide by 64 circuit 644, the three most significant stages of which are connected to the input of a one out of eight decoder circuit 645. The decoder circuit 645 is connected to the control inputs of eight transmission gates 671 – 678. Each of the transmission gates is connected between one plate of one of capacitors 681 – 688 and a positive voltage lead +V. The other plates of the capacitors 681 – 688 are connected in common to the input of a rectifier circuit 689. The output of the rectifier circuit is connected to a signal input 691 of a comparator circuit 690 and also connected to the anode electrode of a diode 619. An input resistor 679 is connected in series between the signal input of the commutating filter circuit and the junction of the capacitors 681 – 688 and the input of the rectifier circuit 689. The comparator circuit 690 includes a threshold input connected to a threshold lead 617, common to all the commutating filter circuits, and also includes a digital output connected to a lead 699. The comparator circuit 690 in the remaining commutating filter circuit 622 – 628 are likewise connected to lead 692 – 698 respectively. The cathode electrode of each of the diodes 619 are connected to a signal threshold lead 618.

In operation of the circuit in FIG. 6, signals from the outputs of the filter 515 – 517 in FIG. 5 are conducted to various of the commutating filter circuits 622 – 629 as determined by the outputs of the decoder 621 which control the states of the filter transmission switches 630 – 641. Clock signals from the clock output register are prescaled by the divide by 64 counter 644 and decoded by the decoder 645 to sequentially switch ON each of the transmission gates 671 – 678 to individually in turn connect each of the capacitors 681 – 688 to the positive voltage lead +V. These capacitors each effectively provide a commutator segment of the filter. When a gate is ON its associated capacitor begins to charge toward its signal voltage input level from one of the filter transmission switches. However the time constant of the resistor 679 and the capacitor is much longer than the gate ON time so that the capacitor cannot be fully charged during a single ON time interval. The time constant determines the band width of the filter in that the longer the time constant the narrower the band width. If the input signal is a multiple of the commutating frequency of the gates 671 – 678, the signal voltage on a particular capacitor is the same each time its associated gate is ON. After a number of commutating cycles, the potential across the capacitor becomes the value of the input signal. Random signals, periodic signals and signals which are periodic but not of a frequency which is a multiple of the commutating frequency do not become stored on the capacitors. Signals within the band width of the filter eventually appear substantially without significant attenuation at the input of the rectifier circuit 689. The rectifier circuit is preferably an active rectifier having an input impedance much higher than the resistances of the resistor 679. The rectifier circuit 689 generates an output signal representative of the amplitude envelope of the signal at its input. The output of the rectifier circuit 689 is compared, by the comparator circuit 690, with a threshold voltage on the lead 617. In the event that the threshold voltage is less than the output of the rectifier, the comparator circuit 690 asserts a signal on its associated output lead 692 – 699. The diode 619 in each of the commutating filter circuits combine to logic OR the rectified outputs onto the threshold lead 618. Hence at the outputs of the circuitry in FIG. 6, the presence of a signalling frequency being received and falling within limits determined by an instruction word is detected and a measure of its amplitude as it is received by the commutating filter is provided via the diode 619.

Figure 7:
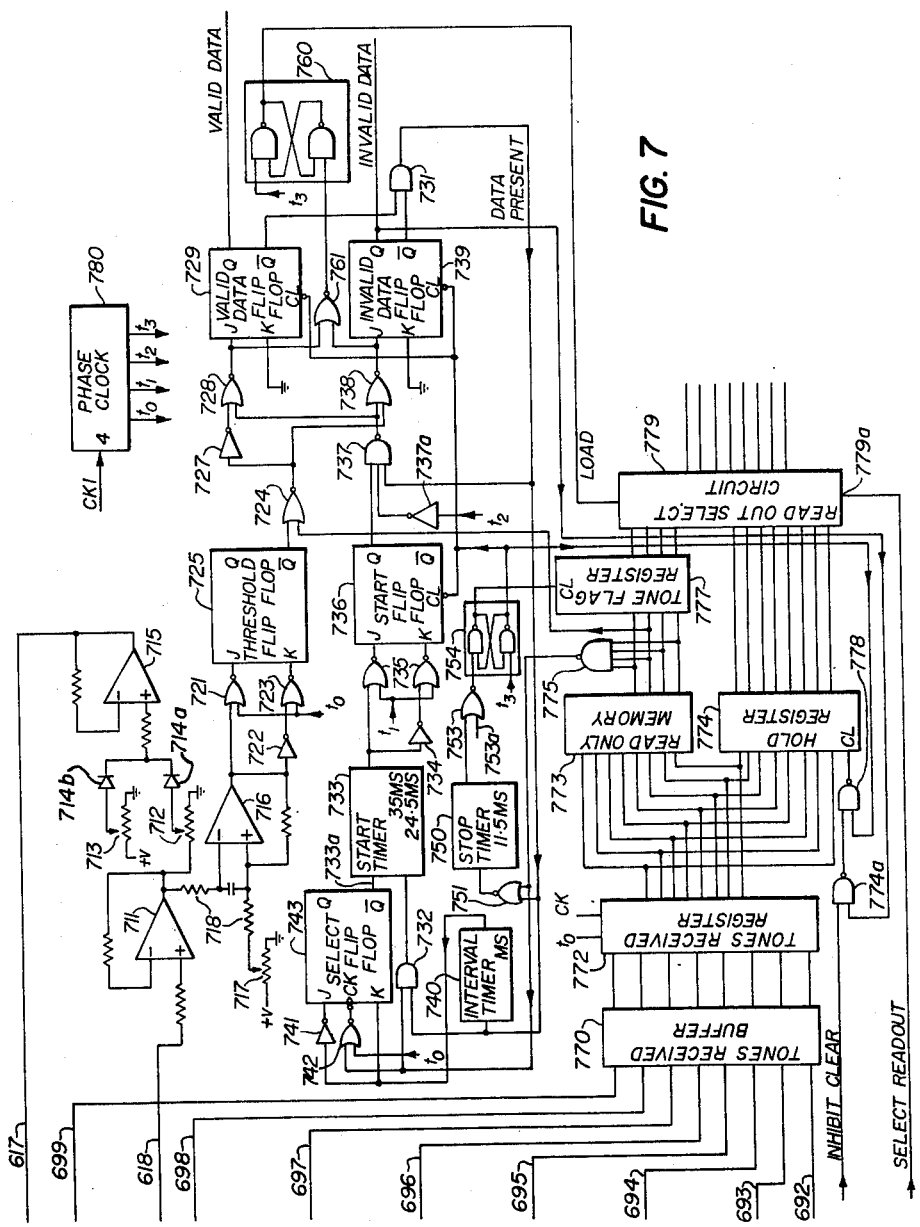
FIG. 7 is a block schematic diagram of a register and verification circuit used in FIG. 1.

Referring to FIG. 7, the purpose of the checking and readout circuit is to receive both analogue and digital tone received signals from the commutating filters 622 – 629, and by measuring the amplitude, combination and duration of these signals determine if valid data has been received. The circuit also provides a threshold signal to the commutating filters 622 – 629.

In order to make the required determination the circuit operates on three timing intervals. A start timer initially times the signal presence for a period of about 35 milliseconds to determine the initial presence of signalling. On following signalling is timed for about 10 milliseconds less before it is accepted as being valid. The difference in the times is provided so that the AGC circuit 510 and the filter 512 – 514 in FIG. 5 have time to settle through a transition from its quiescent to its dynamic operating state. The third time interval is provided by a stop timer and is about 11 milliseconds in length. This third time interval is that time which when exceeded by an absence of signalling is used to determine the valid cessation of the signalling as contrasted with intermittent shorter interruptions which are characteristic of some telephone transmission facilities.

In more detail, the circuit in FIG. 7 is connected to the circuit in FIG. 6 via leads 692 – 699 which terminate at the input of a tones received buffer 770. The threshold lead 618 in FIG. 6 is connected to an amplifier 711. The output of the amplifier 711 is connected via a potentiometer 712 to ground and to a diode 714a in an analogue OR gate. A potentiometer 713 is connected between a plus voltage and ground, and includes a wiper connected to another diode 714b in the analogue OR gate. The cathodes of the diodes 714a and 714b are connected to the input of an amplifier 715, the output of which is connected to each of the threshold inputs of the commutating filters 622 – 629.

In operation, the portion of this circuit thus far described is used to generate the threshold voltage for the commutating filters. Normally the signal level from the potentiometer 713 predominates through the diode 714b and thus determines the output level of the amplifier 715. The highest rectified output signal from the commutating filter predominates on the lead 618 and determines the output of the amplifier 711. In very noisy conditions this signal, conducted via the variable resistance 712, will from time to time momentarily predominate through the diode 714a and so produce a dynamic threshold signal at the output of the amplifier 715.

Returning now to the structure of the remainder of the checking circuit, a comparator 716 includes inverting and non-inverting inputs which are connected to the output of the amplifier 711 and to a reference level respectively via resistors 718. The reference level is provided at the arm of a potentiometer 717 which is connected between plus voltage and ground. A four phase clock 780 is connected to the system clock and includes outputs $t_0 - t_3$. The digital outputs 692 – 699 of the commutating filters 622 – 629 are each connected to inputs of the tone received buffer 770 which includes eight outputs connected to eight inputs of a tones received register 772. The tones received register 772 includes a gating input connected to the $t_0$ output of the clock 780. The tones received register 772 includes eight outputs each connected to a separate input of a read only memory 773 and a hold register 774. The hold register 774 also includes a CLEAR input (CL) and eight output leads connected to inputs of a readout select circuit 779. The read only memory 773 includes four outputs connected to a NAND gate 775 and to inputs of a tone flag register 777. The tone flag register 777 also includes a CLEAR input (CL) and four outputs connected to inputs of the readout select circuit 779. The readout select circuit 779 also includes a control input 779a.

The remainder of FIG. 7 includes various gates and flip flops. Five flip flops of the J-K type are used in this embodiment, a threshold flip flop 725, a valid data flip flop 729, a select flip flop 743, a start flip flop 736 and an invalid data flip flop 739. The configuration and function of J-K flip flops is well known, hence in this figure all PRESET inputs are not shown as they are never asserted in operation. Likewise only the CLEAR inputs which are asserted in operation of the circuit are shown, and finally it is to be assumed that system clock is connected to and utilized by the flip flops and various of the registers in a manner well known to those familiar with digital circuitry. The output of the comparator 716 is connected in complement to the inputs of the threshold flip flop 725, via an inverter 722 and NOR gates 721 and 723 each of which included an input connected with the $t_0$ output of the clock 780. The $\overline{Q}$ output of the threshold flip flop 725 is connected to the J inputs of the valid data flip flop 729 via NOR gates 724 and 728 and an inverter 727. The $\overline{Q}$ output is also connected to the J input of the invalid data flip flop 739 via the NOR gate 724 and a NOR gate 738. The NOR gate 724 also includes an input connected with one of the outputs of the read only memory 773. The $\overline{Q}$ outputs of the flip flops 729 and 739 are connected to the inputs of an AND gate 731, the output of which is connected to an input of each of the following: an AND gate 732; a NAND gate 737, and a NOR gate 751. The gates 732 and 751, and a NOR gate 742 each include one input connected to the output of the NAND gate 775. The NOR gate 742 includes an input connected to the $t_0$ output of the clock 780. There are three timing circuits in the digital portion of the circuitry, these are an interval timer 740, a start timer 733 and a stop timer 750. One input of the start timer 733 is connected to the output of the AND gate 732. The interval timer 740 includes one input connected with the output of the AND gate 731 and an output connected to the K input of the select flip flop 743 and via an inverter 741 to the J input of the select flip flop 743. The $\overline{Q}$ output of this flip flop is connected to another input 733a of the start timer 733. The output of the start timer circuit 733 is connected in complement to the inputs of the start flip flop 736 via an inverter 734 and NOR gates 735. The NOR gates 735 each include an input connected to the $t_1$ output of the clock 780. The Q output of the start flip flop 736 is connected to an input of the NAND gate 737. The NAND gate 737 includes one more input connected to the $t_2$ output of the clock 780 via an inverter 737a. The output of the NAND gate 737 is connected to one input of the NOR gate 738 and the NOR gate 728. The output of the NOR gate 751 is connected to the input of the stop timer 750, the output of which is connected to the set input side of a latch circuit 754 via a NOR gate 753 which includes an additional input 753a. The output $t_3$ of the clock 780 is connected to the reset side of the latch circuit 754. One output of the latch circuit 754 is connected to the CLEAR input of the tone flag register 777 and the other side of the latch 754 is connected to the CLEAR inputs of the flip flops 729, 736 and 739, and to an input of a NAND gate 778. The Q output of the invalid data flip flop 739 is connected to an input of a NAND gate 774a and an inhibit clear lead is connected to another input of the NAND gate 774a. The output of the NAND gate 774a is connected to another input of the NAND gate 778, the output of which is connected to a CLEAR input of the hold register 774. The outputs of NOR gates 728 and 738 are each also connected to inputs of a NOR gate 761, the output of which is connected to one input side of a latch circuit 760. The $t_3$ output of the clock 780 is connected to the other input side of the latch circuit 760. An output from the latch circuit 760 is connected to a load control input of the readout select circuit 779.

In operation, each of the timers operate in the milliseconds range and the associated digital circuitry is sequenced by the four phase clock 780 in the sub-microsecond range. In this embodiment each of the outputs $t_o - t_3$ is sequentially asserted for a period of about 250 nanoseconds. During each sequence, the existing input conditions are examined to determine the status of the systems.

In order to describe the function of the checking circuit it is assumed that valid signalling frequencies $f_o$ and $f_1$ are being received. A start interval is defined by the start timer 733 and the action of the checking circuit during the start interval will not be examined. As $f_o$ and $f_1$ are being received, the appropriate indication appears on two of the leads 692 - 699.

During time $t_o$, the asserted output $t_o$ and the clock signal CK1 cause the tones received register 772 to load the state of the leads 692 - 699 via the tones received buffer 770. The output of the tones received register is decoded by the read only memory 773 which generates an output corresponding to one of its four output leads corresponding to the number of inputs asserted; output one for one tone, output two for two tones, output three for three tones, and output four in the case of four and more tones received. The output of the NAND gate 775 indicates any tone present. This indication is gated to the start timer 733 via the AND gate 732, if there is no data already present as would be indicated at the output of the AND gate 731. The output of the select flip flop 743 determines one of two timing intervals through which the start timer operates. The select flip flop 743 follows the state of the interval timer only in the event that the output of the NAND gate 775 is not asserted. Assuming that the signal level on the lead 618 is high enough, the threshold flip flop 725 changes state, asserting its $\overline{Q}$ output to indicate that sufficient signal amplitude is being received. Assuming the tones perist, nothing further will happen until the start timer 733 times out in about 35 milliseconds. If the tones disappear the start timer will reset and the cycle will start once tones reappear. When the output of the start timer 733 goes low, the start flip flop 736 changes state during time $t_1$. Also during time $t_1$, the state of the stop timer 750 is gated to the latch circuit 754. However, as the operation of the start and stop timers is mutually exclusive, while the start timer is active, the stop timer is prevented from being active.

During the next time interval $t_2$, a decision is made as to whether the data in the tones received register 772 is valid or non-valid. Since in this case it is assumed to be valid, the second output from the read only memory 773 is low, and the output of the threshold flip flop 725 is low causing the output of the NOR gate 724 to be high. As the start timer times out the Q output of the start flip flop 736 goes low, which in combination with the output of the inverter 737a causes the output of the NAND gate 737 to go low. This causes the output of the NOR gate 728 to go high and set the $\overline{Q}$ output, of the valid data flip flop 729, high to indicate valid data. When either the valid data flip flop 729 or the invalid data flip flop 739 is set, the output of the AND gate 731 goes high to reset and disable the start timer 733 via the AND gate 732, to enable the stop timer 750 via the NOR gate 751, and to cause the interval timer 740 to be reset. The outputs of the NOR gates 728 and 738 causes the output of the NOR gate 761 to go low setting the latch circuit 760. When the latch circuit 760 is set the read select circuit 779 outputs the data from either the tone flag register 777 or from the hold register 774, as determined by the state of the select readout lead 779a. During time $t_3$ the latch circuit 760 is reset.

Now assuming that the tones are no longer being received, when the tones received register 772 is loaded, none of its output leads will be asserted. Hence none of the leads from the read only memory 773 will be asserted and the output of the NAND gate 775 is low. This enables the select flip flop 743 to follow the output of the interval timer 740. Assuming the interval timer 740 has not timed out, its output is high, causing the $\overline{Q}$ output of the select flip flop 743 to go high to select a shorter time interval of about 24.5 milliseconds in the start timer 733. Conditions now remain static until the stop timer 750 times out. During time interval $t_1$, the state of the stop timer 750 is gated, via the NOR gate 753, to the latch circuit 754. When the stop timer 750 times out, the latch circuit 754 is set which in turn causes the tone flag register 777 to be cleared. The start flip flop 736, the valid data flip flop 729 and the invalid data flip flop 739 are likewise cleared, and the hold register 774 is also cleared via the NAND gate 778. Thus the output of the AND gate 731 goes high, enabling the start timer 733 and disabling the stop timer 750. The time duration $t_2$ is not utilized during the stop interval and the time interval $t_3$ causes the latch circuit 754 to be reset.

In the case where the number of tones apparently received is incorrect, i.e. in this embodiment, one or three or more tones, the above described operation is the same except that the first, third or fourth output leads of the read only memory 773 are asserted. This causes the output of the NOR gate 724 to be low which causes the output of the NOR gate 738 to be high and sets the invalid data register 739. This inhibits the hold register 774 from being loaded with data from the tones received register 772 by supplying a continuous clear signal at the clear input of the hold register via the gates 774a and 778. Thus when data is not valid, no data appears at the data output unless the clear in inhibited via the inhibit clear lead from the input output circuitry in FIG. 1.

What is claimed is:

1. A universal receiver sender apparatus for use in combination with a telephone switching facility including a digital data processing unit, bus means for connecting the processing unit to the receiver sender apparatus, and a supervisory signalling trunk means having receiving and sending portions for connecting the receiver sender apparatus to a telephone transmission facility selected by the telephone switching facility, the receiver sender being responsive in its operation to instruction words directed thereto by the processing unit, the receiver sender apparatus comprising:

means for generating a plurality of clock signals, each appearing at a respective output thereof, each clock signal having a pulse repetition frequency directly proportional to a predetermined frequency multiplied by the value of a respective instruction word from the processor;

means for receiving signals from the receive portion of the supervisory trunk and passing only those received signals having frequencies within a passband as determined by the response of the receiving means to a control word from the processor;

a plurality of commutating filter means each having an analogue input connected to the receiving means for receiving the signals passed by the receiving means, and a control input connected to the generating means for receiving a respective one of the plurality of clock signals, each commutating filter having a passband center frequency as determined by the pulse repetition frequency of said clock signal, each commutating filter means having a digital output for indicating that a signal within the passband has been received;

signal generating means having an analogue output connected to the sending portion of the supervisory signalling trunk, and an input connected to the generating means, said input for receiving a predetermined one of said plurality of clock signals, the signal generating means being responsive to said one clock signal to generate at said analogue output a substantially sinusoidal signal having a frequency directly proportional to the pulse repetition frequency of said one clock signal;

whereby the receiver sender apparatus is programmable to receive and transmit multiple frequency signalling in a plurality of different signalling formats.

2. A universal receiver sender apparatus for detecting signalling information from a transmission facility in a telephone network, and for transmitting signalling information from a switching facility to the telephone network, the receiver sender apparatus having operating parameters substantially defined by a set of word instructions, the switching facility including, a control unit and control bus means for connection between the control unit and the receiver sender apparatus, and signalling trunk means including a signal trunk circuit for connection between the receiver sender apparatus and a transmission facility in the telephone network as selected by the switching facility, the receiver sender apparatus comprising:

clock means for generating clock signals, the clock means including a work store, each clock signal having a pulse repetition frequency as defined by an instruction word originating in the control unit and stored at a predetermined location in the word store;

receiving means connected to said clock means and to said signal trunk circuit for receiving multiple frequency signals from the signal trunk circuit and for detecting multiple frequency signal frequencies within at least one predetermined passband having a centre frequency as defined by one of said clock signals;

signal generating means connected to said clock means and having an output connected to said signal trunk circuit, the signal generating means for generating and transmitting a multiple frequency signal having frequencies as defined by others of said clock signals whereby supervisory signalling signals in a format defined by the set of word instructions are interfaced between the switching facility and the telephone network.

3. A universal receiver sender apparatus as defined in claim 1, in which the signal generating means includes an amplitude control means responsive to one of said instruction words to control the amplitude of said substantially sinusoidal signal.

4. A universal receiver sender apparatus as defined in claim 2, in which the signal generating means includes a digital to analogue converter means responsive to one word of the set of word instructions for generating a corresponding analogue voltage.

* * * * *